(12) United States Patent
Kulazhanov et al.

(10) Patent No.: US 9,480,269 B2
(45) Date of Patent: Nov. 1, 2016

(54) METHOD FOR PRODUCING DAIRY PRODUCTS (VARIANTS)

(76) Inventors: Kuralbek Kulazhanov, Almaty (KZ); Nataliya Yurievna Vykhrest, Almaty (KZ)

( * ) Notice: Subject to any disclaimer, the term of this patent is extended or adjusted under 35 U.S.C. 154(b) by 2 days.

(21) Appl. No.: 14/002,735

(22) PCT Filed: Feb. 27, 2012

(86) PCT No.: PCT/KZ2012/000001
§ 371 (c)(1),
(2), (4) Date: Nov. 18, 2013

(87) PCT Pub. No.: WO2012/121578
PCT Pub. Date: Sep. 13, 2012

(65) Prior Publication Data
US 2014/0227406 A1    Aug. 14, 2014

(30) Foreign Application Priority Data

Mar. 9, 2011    (KZ) .................................. 2011/0232

(51) Int. Cl.
| | | |
|---|---|---|
| *A23C 7/02* | (2006.01) | |
| *A23C 3/07* | (2006.01) | |
| *A23L 3/26* | (2006.01) | |
| *A23C 3/033* | (2006.01) | |

(52) U.S. Cl.
CPC . *A23C 3/07* (2013.01); *A23C 7/02* (2013.01); *A23L 3/26* (2013.01); *A23C 3/033* (2013.01)

(58) Field of Classification Search
CPC ........... A23L 3/26; A23C 7/02; A23C 3/033; C11D 3/044; C11D 3/2075; C11D 3/33; C11D 3/36; C11D 3/06; C11D 3/265; C11D 3/3245; C11D 11/0064

USPC ................ 426/237, 520–521, 246, 247–248; 99/275, 452–453, 468, 483
See application file for complete search history.

(56) References Cited

U.S. PATENT DOCUMENTS

| | | | | |
|---|---|---|---|---|
| 4,042,325 | A | * | 8/1977 | Tensmeyer ...................... 422/22 |
| 4,212,761 | A | * | 7/1980 | Ciaccio .......................... 510/234 |
| 4,587,264 | A | * | 5/1986 | Jourdan-Laforte et al. .. 514/557 |
| 4,661,264 | A | * | 4/1987 | Goudy, Jr. ................ 210/748.06 |
| 5,562,822 | A | * | 10/1996 | Furness et al. ................ 210/188 |
| 6,010,727 | A | * | 1/2000 | Rosenthal ...................... 426/240 |
| 6,889,603 | B2 | * | 5/2005 | Carhuff et al. ................. 99/452 |
| 7,682,641 | B1 | * | 3/2010 | Vasilenko ...................... 426/237 |
| 2013/0000681 | A1 | * | 1/2013 | Johnson et al. ........... 134/22.19 |

FOREIGN PATENT DOCUMENTS

NZ    WO 2010045686 A1 *  4/2010  ............... A23C 7/02

OTHER PUBLICATIONS

English Translation WO2007136237, Baidindaeva et al., pp. 1-4.*

* cited by examiner

*Primary Examiner* — Steven Leff
(74) *Attorney, Agent, or Firm* — John Alumit

(57) ABSTRACT

A method for producing dairy products used in the food industry in milk processing plants involving the laser treatment of raw milk under turbulent flow conditions at a reception point, and heat treatment to produce pasteurized milk in equipment sanitized using rinsing and cleaning agents treated with laser radiation. Another variant of the method comprises the laser treatment of raw milk under turbulent flow conditions at the reception point, heat treatment to produce pasteurized milk in equipment sanitized using rinsing and cleaning agents treated with laser radiation, and the subsequent processing of the pasteurized milk into dairy products.

4 Claims, No Drawings

METHOD FOR PRODUCING DAIRY PRODUCTS (VARIANTS)

CROSS-REFERENCE TO RELATED APPLICATION

This application claims the benefit of the priority filing date in PCT/KZ2012/000001 filed on Feb. 27, 2012 and referenced in WIPO Publication No. WO2012/121578. The earliest priority date claimed is Mar. 9, 2011.

FEDERALLY SPONSORED RESEARCH

Not Applicable

SEQUENCE LISTING OR PROGRAM

Not Applicable

BACKGROUND

The invention relates to the food industry and can be used in the dairy industry, in particular, in milk processing plants.

One of the ways for the dairy industry to update the structure of healthy eating is to improve the appeal of dairy products in order to create conditions for healthy and sustainable living. Among other actions, this includes supplying the population with quality food products that would supplement the human body with vitamins, minerals, and other vital substances, which, if misbalanced, can cause many grave diseases. When a product is protected from spoilage by microorganisms, the losses from spoiling are reduced, and when a product has a long shelf life, it can be provided to a larger number of people.

The description of the present invention clearly demonstrates how the embodiments of the present invention directed at solving this problem can be implemented in industry to produce dairy products by applying the technical means and technology disclosed in the present invention.

A method for irradiating milk with laser beams is known in the art (RF Patent #2019515, IPC C 02 F 1/30, published Sep. 15, 1994). A method for milk enrichment based on the irradiation of pasteurized milk with laser beams to increase its biological value is known in the art (USSR Patent #1794288, IPC A 23 C 1/00, 1990).

One of the important factors that additionally affects the quality and shelf life of dairy products is industrial sanitation. Physical, microbiological, and chemical contamination of the processing equipment results in the introduction of hazardous materials and impurities into the raw materials and finished products, proliferation of microorganisms, and rise of metabolic products thereof (toxin, etc.), which are hazardous to the health of food product consumers. Microfloral activity causes a sharp rise in the acidity of raw milk during storage, as microorganisms grow within.

A method for treating industrial processing equipment with "Calgonit NN 5454" preparation comprising an alkaline component, various surfactants and water softeners (sequestrants) or with the nitric acid-based "Calgonit Yalu Zauer Plus" preparation, additionally comprising special additives enhancing the cleaning properties and inhibitors reducing the effect of nitric acid on stainless steel is known in the art. (Modern Solutions to Sanitation and Hygiene Problems in Dairy Industry. http:w.w.w.klintech-m.ru/127/. Cleaning and Disinfecting in Dairy Industry//Kazakh Food and Food Processing Industry, 2008, #6, p. 22).

A method for sanitizing milk processing equipment, comprising removal of product residue with water, addition of an alkaline cleaning agent (sodium hydroxide) and circulation inside the object being washed, rinsing with water to remove all traces of the alkaline cleaning agent, addition of an acidic cleaning agent (nitric acid) and circulation inside the object being washed, and rinsing with water to remove all traces of the acidic agent, is known in the art. (Zh. I. Kuzina, O. P. Burygin, Cleaning the Ultrafiltration Devices//Dairy Industry, 2007, #2, p. 73).

The disadvantages of the invention of the RF Patent #2019515 are the low efficiency of disinfecting the liquid and high specific energy consumption.

Another method found in the prior art, the USSR patent #1794288, is inefficient. In addition, this method is intended for the enrichment of milk with free calcium only, as well as with vitamins E and C. Thus, altering the main milk ingredients and characteristics, destroying the vitamins and enzymes, and causing other undesirable changes resulting in the reduction of the product's nutritional and biological value, said method does not completely eliminate these disadvantages. In addition, the total milk acidity, serving as a criterion of its quality and shelf life, is reduced in said method by less than 1° T.

The use of cleaning agents manufactured by the Calvatis Gmbh Company (Germany) under the trade name "Calgonit" is an expensive way to improve the quality of the cleansing process because of the high cost of the preparations. Therefore, it cannot be disregarded that the vast majority of dairy manufacturers can't afford using all but the least expensive and most widely available cleaning agents.

Cleaning with low-cost agents is known to be primitive and inefficient due to the weak cleansing ability of sodium hydroxide and nitric acid. High surface tension of their solutions, which doesn't allow for a complete wetting of the contaminated surface, results in a partial dissolution of the organic and mineral deposits, including milk stone. The latter inhibits heat transfer, lowers the production capacity of the processing equipment, shortens its operational cycle, and increases its heat requirements. The pockets with insufficient flow rate of the cleaning solution collect product residue, which become an active source of fungus, mold, and *E. coli*. An improper aseptic treatment of the equipment greatly increases the danger of contaminating the dairy products with pathogenic microorganisms, which adversely affects the shelf life and safety of food products.

The objective of the present invention is to increase the shelf life of dairy products by reducing the acidity of the incoming raw milk by 2° T-3° T, increasing the antibacterial stage, improving milk quality as determined by bacterial count and heat resistance, optimizing the sanitizing process of the processing equipment used in the majority of milk processing plants by using caustic soda and nitric acid and boosting the cleaning effect of their solutions.

SUMMARY

The technical result of the present invention provides a solution to a major problem of the milk processing industry—prolonging preservation of the raw milk beneficial properties. This result ensures the most comprehensive use of milk components as well as processing using maximum beneficial properties of the raw milk components, which improves food safety and the biological value of dairy and cultured milk products. Due to the low energy consumption (power consumption of one module of the laser is 100-200 W/hr.) during laser irradiation of raw milk and the agents used for rinsing and washing the milk processing equipment, the total energy consumption of a plant is minimized.

Increased antibacterial activity of raw milk is achieved without bactofugation, yet it greatly (~ up to 90%) suppresses the microbial activity (less than 500,000 bacteria per 1 ml of milk (premium quality) as compared to the control, containing up to 4 million bacteria per 1 ml (second-rate quality). Because the product is protected from spoilage by microorganisms, the financial losses from spoiling are reduced, and since the food product is now safe, it is available to a larger number of people, which creates conditions for good health and for sustainable living for people supplied with quality food products.

In addition, there can be a 65% reduction in caustic soda consumption, a hazardous for the environment substance. This improves the ecological safety of the production and minimizes the processing need for using alkaline agents, without reducing the quality of aseptics. Moreover, since milk stone deposits on the inner surface of heating devices are significantly reduced, the method of the present invention improves the unit capacity without a need for modernization, reduces heat requirements and decreases the chance of post-pasteurization or post-sterilization recontamination with thermophilic bacteria, which proliferate in milk stone deposits. The shelf life of pasteurized milk produced by the method of the present invention increases 2.75-fold. The shelf life of pasteurized dairy products made from such milk also increases: for sour cream —3.43-fold, for farmer cheese −5.25-fold, for kefir —3-fold.

Said technical result is achieved by utilizing the method for producing dairy products according to the first embodiment, comprising sanitization of the processing equipment by flushing out the milk product residues, circulation-washing with alkaline and acidic cleaning agents, and flushing out the remains of the cleaning agents and heat-treatment of raw milk on said equipment, wherein flushing-out agents, alkaline and acidic cleaning agents and raw milk in the receiving area under turbulent flow conditions are irradiated with laser beams.

The same technical result is achieved by utilizing the method for producing dairy products according to the second embodiment, comprising sanitization of the processing equipment by flushing out the milk product residues, circulation-washing with alkaline and acidic cleaning agents, and flushing out the remains of the cleaning agents and heat-treatment of raw milk on said equipment, wherein flushing-out agents, alkaline and acidic cleaning agents and raw milk in the receiving area under turbulent flow conditions are irradiated with laser beams, and following the heat treatment, the milk is processed into dairy products.

Caustic soda and nitric acid are used as alkaline and acidic cleaning agents, respectively, and water is used as the flushing-out agent.

DESCRIPTION

Said method is carried out as follows: in both embodiments, when there is a call for a unit, for example, a heat exchanger (such as pasteurizer, sterilizer, etc.) to be washed, the processing equipment is circulation-washed. Washing the inside of the unit is conducted in such a way as to direct the flow of water and of the cleaning solutions to be confluent with the milk flow. During sanitization of the unit, water and cleaning agents are irradiated with laser beams with experimentally determined operating parameters. The location of the laser equipment in the technological chain and the effect thereof are chosen based on the water and cleaning solution treatment conditions upstream from the entry point of said agents into the unit to be washed.

Sanitization of the equipment is conducted following the procedures set in accordance with the sanitary regulation requirements. At the initial treatment stage, the product residue is flushed out of the system with water. A solution of alkaline cleaning agent, such as caustic soda, is then added, and the unit is circulation-washed; upon completion of the circulation-wash cycle, the alkaline solution is flushed out with water until the system reaches a neutral pH. A solution of acidic cleaning agent, such as nitric acid, is then added, and the unit is circulation-washed. At the final stage of the treatment, the acidic solution is flushed out with water until the system reaches a neutral pH. A complete removal of the cleaning alkaline and acidic agents is confirmed with universal indicator paper according to TU 6-09-1181-76, having a 1 to 10 pH range. Quality control of the microbiological purity of the treated equipment is carried out in a microbiological study of the washings.

A product, for example, from a commercial dairy farm/s, namely raw cow milk, is transferred in a shipping container to a milk processing plant, and at receiving, it is poured into a receiving tank. Raw milk is irradiated with laser beams right there, in the receiving tank, in the incoming flow area.

The location for laser irradiation of milk during incoming thereof into the receiving tank in the receiving area was chosen because in the milk receiving area, a turbulent flow of the incoming milk is spontaneously created in the receiving tank. Laser irradiation of the turbulent milk flow, i.e. in the turbulent flow area, creates conditions where laser irradiation penetrates every layer of the milk flow to be disinfected, both peripheral and central. This evens out the effect of the laser on the flow portions located at different distances from the entry point of the laser into the milk flow, which intensifies the eradication of the microorganisms in the milk. Irradiation of milk conducted specifically in the turbulent flow area creates favorable conditions for energy exchange between the irradiated layers of raw milk incoming into the receiving tank and the non-irradiated layers. Furthermore, because the energy that a milk layer receives in laser-irradiated areas of the receiving tank is transferred to the adjacent milk layers via a contact between the irradiated layers and non-irradiated layers, laser irradiation and activation of the entire milk flow to be processed transpires by way of the laser irradiation effect occurring in the liquid medium of said biological fluid. In said process, the intensification of sanitization and activation of such cloudy liquid as milk, which possesses a strong ability to absorb laser radiation, occurs at the location of laser treatment, namely, in the milk receiving area.

Raw milk treatment parameters are determined experimentally, depending on the season (summer milk, winter milk, etc.), the length of time since receiving, microflora, biological composition, source, etc. For that, the direction of irradiation is also selected in the preferred planes relative to the raw milk flow in the receiving tank.

Acidity of the examined milk (raw and processed) is determined by titration. Bacterial count of milk is determined in the reductase tests and microbiological assays.

In the first embodiment, raw milk irradiated with laser beams in the receiving area is heat-treated, for example, pasteurized, to produce a dairy product in the form of pasteurized milk on the equipment cleaned with laser-irradiated agents. In the second embodiment, raw milk irradiated with laser beams in the receiving area is heat-treated, for example, pasteurized, wherein pasteurized milk is produced on the equipment cleaned with laser-irradiated agents. After heat treatment (pasteurization), said milk is processed in the technological processes, each of which is known in the art for the production of a specific dairy product (sour cream, farmer cheese, kefir, etc.)

The following examples are meant to illustrate, but in no way to limit, the scope of the present invention.

EXAMPLE 1

On receiving, raw cow milk is irradiated with 0.02 W laser beams and a $1/60$ min. exposure under turbulent flow conditions, followed by the reductase test. Milk acidity is determined not earlier than 2-3 hrs. after the start of treatment.

The control sample is not irradiated with laser beams in all examples, both this one and the following.

EXAMPLE 2

Same as above, but with an 8 min. exposure.

EXAMPLE 3

Same as above, but with a 15 min. exposure.

EXAMPLE 4.

Same as in Example 2, but with the reductase testing performed after a 1.5-day storage period in a tank.

EXAMPLE 5

An AMP plate pasteurizer (Hungary, producer of 600 L/hr., pasteurization temperature 80° C.-95° C., pasteurization time 60-300 sec.) at the Ferzikovo milk-processing plant "Aukat Obis LTD" LLP "Obis LTD" is sanitized by circulation as follows:
- Flushing out product residues with top water until only clean water comes out of the system.
- Washing with 1% caustic soda solution for 40 min. at 65° C.
- Flushing out the system with top water to neutral pH.
- Washing with 0.5% solution of nitric acid for 40 min. at 65° C.
- Flushing out the system with top water to neutral pH.

As flushing-out agents and washing agents are added to the unit being washed, they are irradiated with laser beams in the water drainage and solution preparation zone throughout the entire addition time.

Water and cleaning solutions in the control are not irradiated with laser beams in all examples, both this one and the following.

EXAMPLE 6

Equipment, stages, sequence thereof, cleaning agents and sanitizing schedule are the same as those in Example 5, alkali concentration is 0.70%.

EXAMPLE 7

Washing process is the same as in Example 5, alkali concentration is 0.35%.

EXAMPLE 8

Washing is the same as in Example 5, alkali solution concentration is 0.30%.

EXAMPLE 9

Sanitizing wash of the pasteurizer is the same as in Example 7; raw cow milk irradiation with laser beams is the same as in Example 3, followed by pasteurization, and maintaining the pasteurizer's temperature control.

EXAMPLE 10

Raw milk pasteurized as in Example 9 is processed to produce farmer cheese.

EXAMPLE 11

Raw milk pasteurized as in Example 9 is processed to produce sour cream.

EXAMPLE 12

Raw milk pasteurized as in Example 9 is processed to produce kefir.

The effect of laser treatment on microflora, evaluated based on the data obtained from the reductase test, is shown in Table 1 (examples 1-4). Bacterial count of raw milk activated with laser beams in the receiving area and of the pasteurized milk produced therefrom as compared to the control is shown in Table 2. Data on the changes in acidity of raw milk irradiated with laser beams are shown in Table 3. Data on the changes in heat resistance of raw milk irradiated with laser beams are shown in Table 4. Table 5 compares the data from Examples 5-8 demonstrating how the quality of sanitizing treatment of milk-processing equipment affects the shelf life of dairy products. Table 6 shows the increase in the shelf life of dairy products processed in the equipment sanitized with laser technology in comparison to the shelf life of dairy products produced in the traditionally cleaned equipment. Table 7 shows the effect of the concentration of caustic soda solution irradiated with laser beams on the quality of cleaning the pasteurizer. Table 8 shows the effect of laser treatment of raw milk in the receiving area and of the flushing-out and washing agents used for cleaning milk-processing equipment on the shelf life of dairy products.

TABLE 1

The Effect of Laser Treatment on Microflora Evaluated Based on the Data Obtained from the Reductase Test

| Example # | Discoloration time (hr.) Control | Discoloration time (hr.) Activation | Exposure (min.) | Laser beam power (W) |
|---|---|---|---|---|
| 1 | 1 | 3 | 1/60 | 0.02 |
| 2 | 1 | 4 | 8 | 0.02 |
| 3 | 1 | 5 | 15 | 0.02 |
| 4 | 1 | 3.5 | 8 | 0.02 |

TABLE 2

The Effect of Laser Treatment on Bacterial Count of Raw and Pasteurized Milk

| Milk | Control CFU/ml | Activation CFU/ml |
|---|---|---|
| Raw | $2 \times 10^6$ | $2 \times 10^5$ |
| Pasteurized | $1 \times 10^5$ | $1 \times 10^4$ |

TABLE 3

Changes in Acidity of Laser-Treated Raw Milk

| N | Acidity (°T) Control | Acidity (°T) Activation | Exposure (min.) | Laser beam power (W) |
|---|---|---|---|---|
| 1 | 18 | 17 | 1/60 | 0.02 |
| 2 | 18 | 16 | 8 | 0.02 |
| 3 | 18 | 15 | 15 | 0.02 |

TABLE 4

Increase in Heat Resistance of Laser-Treated Milk

| Control Heat Resistance (° alcohol test) | Control Group | Activation Heat Resistance (° alcohol test) | Activation Group |
|---|---|---|---|
| 68 | 5 | 75 | 2 |
| 68 | 5 | 75 | 2 |
| 72 | 3 | 75 | 2 |
| 68 | 5 | 72 | 3 |
| 68 | 5 | 72 | 3 |
| 68 | 5 | 72 | 3 |

TABLE 5

The Effect of Quality of Sanitizing Treatment of Milk-Processing Equipment on Shelf Life of Dairy Products

| Alkaline Solution Concentration (%) | Shelf Life (days) Laser-Activation (A) Pasteurized milk | Laser-Activation (A) Farmer Cheese | Laser-Activation (A) Sour Cream | Control (K) Pasteurized milk | Control (K) Farmer Cheese | Control (K) Sour Cream |
|---|---|---|---|---|---|---|
| 1.0 | 8 | 16 | 16 | 4 | 4 | 7 |
| 0.70 | 8 | 16 | 16 | — | — | — |
| 0.35 | 8 | 16 | 16 | — | — | — |
| 0.30 | 5 | 6 | 9 | — | — | — |

TABLE 6

Increase in Shelf Life of Dairy Products Produced in Milk-Processing Equipment Sanitized with Laser-Activated Flushing-out and Cleaning Agents as Compared to the Control

| Alkaline Solution Concentration (%) | Δ = A/K (times) Pasteurized milk | Farmer Cheese | Sour Cream |
|---|---|---|---|
| 1.0 | 2 | 4 | 2.3 |
| 0.70 | 2 | 4 | 2.3 |
| 0.35 | 2 | 4 | 2.3 |
| 0.30 | 1.25 | 1.5 | 1.3 |

TABLE 7

The Effect of the Concentration of Laser-Irradiated Caustic Soda Solution on the Quality of Cleaning the Pasteurizer

| Caustic Soda Solution Concentration (%) | Type of Contamination Control | Type of Contamination Laser Activation | Necessary Actions Control | Necessary Actions Laser Activation |
|---|---|---|---|---|
| 1.0 | Milk stone and solid residue found 3 days later | After 34 days slight residue is formed on pasteurizer plates, no milk stone formed. | Mechanical scrubbing | Soft-brush cleaning |
| 0.70 | — | After 34 days light residue, no milk stone | — | Soft-brush cleaning |
| 0.35 | — | After 34 days slight residue, no milk stone | — | Soft-brush cleaning |
| 0.30 | — | After 7 days residue and some milk stone | — | Soft-brush cleaning |

TABLE 8

The Effect of Laser Treatment of Raw Milk in the Receiving Area and of Flushing-out and Washing Agents Used for Cleaning Milk-Processing Equipment on Shelf Life of Dairy Products Shelf Life of Dairy Products (days)

| Sample # | Laser-Activation (A) of Raw Milk in the receiving area and of Flushing-out and Cleaning Agents for Milk-Processing Equipment | | | | Control (K) No Laser-Activation | | | | Δ = A/K (times) | | | |
|---|---|---|---|---|---|---|---|---|---|---|---|---|
| | Pasteurized milk | Farmer Cheese | Sour Cream | Kefir | Pasteurized milk | Farmer Cheese | Sour Cream | Kefir | Pasteurized milk | Farmer Cheese | Sour Cream | Kefir |
| 9 | 11 | — | — | — | 4 | — | — | — | 2.75 | — | — | — |
| 10 | — | 21 | — | — | — | 4 | — | — | — | 5.25 | — | — |
| 11 | — | — | 24 | — | — | — | 7 | — | — | — | 3.43 | — |
| 12 | — | — | — | 21 | — | — | — | 7 | — | — | — | 3.0 |

Table 1 demonstrates that laser-treated raw milk contains ~ up to 90% less bacteria, which is evident from the discoloration time during the reductase test that increased 3-5-fold (depending on the exposure) as compared to the control. This qualifies the processed milk as "first-rate" (less than 500,000 bacteria per 1 ml), while the untreated raw milk (control) is of "second-rate" (up to 4 million bacteria per 1 ml). It is also evident from Table 1, Sample 4, that even after 1.5 days of storage in a tank, the laser-treated raw milk remains "first-rate" due to the suppressed microbial activity at receiving.

Table 2 demonstrates that laser-activation at receiving lowers the bacterial count of both raw and processed milk by an order of magnitude as compared to the control. In other words, microbial activity is also suppressed in products produced from the laser-treated milk.

Table 3 demonstrates that laser treatment reduces acidity of raw milk at receiving by 2° T-3° T.

Data from Table 4 demonstrate that heat resistance of laser-treated milk increased by 1-3 groups as compared to the control.

Tables 5 and 6 demonstrate that only due to the sanitization of the equipment with laser-activated flushing-out and washing agents, the shelf life of dairy products produced on said equipment increases as follows: for pasteurized milk —2-fold, for farmer cheese —4-fold, for sour cream —2.3-fold. Said result is achieved even when the amount of caustic soda used is reduced by 65%, which points to the enhanced cleaning efficiency of the laser-activated alkaline solution providing a proper aseptics of the equipment, which is evident from Table 6. Thus, milk stone and solid contamination residue are formed on the heating surfaces of the control pasteurizer after a 3-day use. Conversely, the same pasteurizer operates longer by an order of magnitude with no milk stone formation when washed with laser-treated agents.

A further decrease in the concentration of the laser-treated alkaline solution, i.e. below 0.35%, does not lead to the same increase in the shelf life of dairy products.

A plant processing, for example, 15 ton of milk a day, and requiring 50 ton/year of caustic soda for cleaning the equipment, which amounts to $17,250, would use 32 ton less caustic soda a year, amounting to $11,040.

Dairy products produced by the method of the present invention became considerably more stable as, according to the data in Table 8, the shelf life of pasteurized milk was observed to increase 2.75-fold, farmer cheese —5.25-fold, sour cream —3.43-fold, and kefir —3.0-fold.

Amino acid analysis of dairy products produced from milk that had been laser-irradiated in the receiving area demonstrates that the amino acid composition thereof exceeds the standard level by 1%-5%, while maintaining the same qualitative composition.

Preclinical and clinical studies of industrially produced dairy products incorporating laser technology showed them to be safe, have high biological value, improved organoleptic indicators, and they are recommended to be part of a healthy and nutritional diet for people suffering from diseases of the digestive tract.

Improved food safety and biological value as well as extended shelf life of the dairy products give them a competitive edge over imported products and contribute to the industrial growth of the domestic product.

We claim:

1. A method for producing dairy products consisting of sanitization of milk-processing equipment by flushing out the product residue with top water until only clean water comes out of the equipment, circulation-washing the equipment with an alkaline cleaning agent, flushing out the equipment with top water to neutral pH, circulation-washing the equipment with a solution of acidic cleaning agent, flushing out the equipment with top water to neutral pH, pasteurizing raw milk on said equipment, wherein the top water, alkaline and acidic cleaning agents are washed in a direction confluent with milk flow, and said top water, agents and raw milk are irradiated with laser beams in a receiving tank under turbulent flow conditions.

2. The method for producing dairy products according to claim 1, wherein, after heat-treating raw milk on said equipment, processing said milk into dairy products.

3. The method according to claim 1, wherein the alkaline and acidic cleaning agents are caustic soda and nitric acid, respectively, and wherein the top water contains at least 0.35% caustic soda solution.

4. The method according to claim 3, wherein circulation-washing the equipment with 1% caustic soda solution occurs for 40 minutes at 65° C., and circulation-washing of 0.5% nitric acid solution occurs for 40 minutes at 65° C.

* * * * *